United States Patent [19]

Carcia

[11] Patent Number: 4,536,482
[45] Date of Patent: Aug. 20, 1985

[54] CATALYST COMPOSITION

[75] Inventor: Peter F. Carcia, Wilmington, Del.

[73] Assignee: E. I. Du Pont de Nemours and Company, Wilmington, Del.

[21] Appl. No.: 667,057

[22] Filed: Oct. 31, 1984

Related U.S. Application Data

[63] Continuation of Ser. No. 475,031, Mar. 14, 1983, abandoned.

[51] Int. Cl.³ .................. B01J 35/10; B01J 37/02
[52] U.S. Cl. ............................ 502/5; 502/177;
502/200; 502/243; 502/325; 502/332; 502/333;
502/334; 502/344; 502/347; 502/348; 502/350;
502/355; 502/439; 204/192 R; 204/192 C;
204/192 SP; 568/449
[58] Field of Search ......... 204/192 R, 192 C, 192 SP;
502/5, 177, 200, 243, 325, 332, 333, 334, 344,
347, 348, 350, 355, 439

[56] References Cited

U.S. PATENT DOCUMENTS 3,773,894  11/1973  Bernstein et al. ............... 423/213.5
4,046,712  9/1977  Cairns et al. ........................ 252/447

FOREIGN PATENT DOCUMENTS 1455248  11/1976  United Kingdom .
1537839  1/1979  United Kingdom .

OTHER PUBLICATIONS

S. K. Sharma & J. Spitz, Thin Solid Films, 61, L13–15(1979).
A. E. Presland et al., Progress in Surface Science, 3, 63(1973).
B. Abeles et al., Advanced Physics, 24, 407(1975).

*Primary Examiner*—D. E. Gantz
*Assistant Examiner*—Cynthia A. Prezlock

[57] ABSTRACT

A catalyst is disclosed wherein a particulate catalyst support has cosputtered on its surface a mixture of a catalytically active metal such as Pt, Pd, Ag, Au, Re, Rh, Ru or Ir and a cosputtered support material which preferably is the same material as the catalyst support.

8 Claims, No Drawings

CATALYST COMPOSITION

This application is a continuation of application Ser. No. 475,031 filed Mar. 14, 1983 abandoned.

BACKGROUND OF THE INVENTION

1. Field of the Invention

This invention relates to catalysts comprised of a particulate substrate with a composite sputtered thin film on the surface thereof the film comprising one or more metals having catalytic activity and a cosputterable support material.

Ideally a catalyst is a substance that directly accelerates a chemical reaction without itself undergoing either a physical or chemical change. Because of their unique catalytic properties and inherent stability, the metals: Pt, Pd, Rh, Ag, etc., or their alloys, are frequently used as catalysts. Usually it is too expensive to use these metals in bulk form, so that a small amount of metal is supported on a substrate such as $SiO_2$ or $Al_2O_3$. Another motivation for supporting the metal is to disperse it, so that for a given amount of catalytic material, the number of available catalytic sites for the chemical reaction to take place is increased.

2. Prior Art

Commonly used techniques to deposit metal catalysts on a support are impregnation and ion exchange. To obtain high dispersions, the support is typically porous and has a high surface area. In many instances, the support is not inert under reaction conditions and deleterious reactions can occur on its surface, causing loss in catalyst selectivity. Although high dispersions of the catalytically active phase can be obtained during catalyst preparation, it is often difficult to preserve this disposition under conditions in which the catalyst is used. In cases where the support surface causes loss in catalyst selectivity and where the support cannot help maintain the catalyst surface area under reactor conditions, a bulk metal catalyst can be used. The synthesis of formaldehyde by oxidative dehydrogenation of methanol is an example of a process which occurs at high temperature (~650° C.) and uses a bulk Ag catalyst.

An ideal form for a catalyst would therefore be a highly dispersed metal on a low surface area, stable support. In G.B. No. 1,455,248 and U.S. Pat. No. 4,046,712 J. A. Cairns et al. disclose an attempt to make such a catalyst comprising a hard, substantially nonporous particulate substrate having a surface area not greater than about 20 sq. meters per gram and a sputtered deposit of catalytic material comprising one or more of platinum, rhodium, palladium, ruthenium, osmium and iridium. In G.B. No. 1,537,839, J. A. Cairns et al. disclose that it is sometimes beneficial to provide a partial covering of the support material on each sputter-coated support-particle. Preferably the partial covering is in the range of 5-20% of the available surface area. This partial covering may be carried out by contacting the sputter-coated support particles with a dispersion of powdered support material and subsequently firing to adhere the powder to support-particles.

S. K. Sharma and J. Spitz, Thin Solid Films 61, L13-15 (1979) have found that sputtered silver films exhibit hillock growth and agglomeration similar to that shown by silver and other metal evaporated thin films, [see, e.g., A. E. Presland et al., Prog. Surf. Sci. 3, 63 (1973)]. For example, quartz substrates covered with a 500 Å sputtered film of Ag have 60% of the surface area free of Ag after 4 hours of annealing in oxygen at 372° C. It is believed that hillock growth occurs as a result of the relaxation of the thermal stress developed during heating because of the different thermal expansion coefficient of the metal film and the substrate and that agglomeration results from surface diffusion with the kinetics determined by surface energy forces.

Sputtered composites of metals and insulators, known as cermets, have been used as electrical resistors for some time. [See e.g., the review article by B. Abeles et al., Adv. Phys. 24, 407 (1975) which also gives typical procedures used for cosputtering composites.]

SUMMARY OF THE INVENTION

Catalysts of the present invention are formed of low surface area particulate substrates and a sputtered composite deposit comprising one or more catalytically active metals such as Pt, Pd, Ag, Au, Re, Rh, Ru and Ir and a sputterable support material, said metal being in concentrations of 0.01-5.0 weight percent based on the total weight of the substrate and sputtered deposit, i.e., total catalyst, and the relative amount of metal and sputterable support material in the sputtered deposit such that the metal comprises 3-80% of the volume of the sputtered deposit. The invention finds its greatest advantage with the catalytically active metals listed above. Other catalytically active metals such as Ni, Co, Mo, W and Fe are suitable for use in the present invention. Refractory oxides, nitrides and carbides with surface area less than 10 $m^2/g$ are preferred as the particulate substrate material.

Surprisingly, the sputtered composite catalyst of this invention has good catalytic activity and selectivity, despite the fact that it uses only a fraction of the metallic content of a bulk metal catalyst.

The cosputtered support component of the sputtered deposit is preferably an oxide, nitride or carbide and preferably the same material as the particulate substrate. Especially preferred as the cosputtered support component and the substrate material are $Al_2O_3$ and $SiO_2$.

The superior performance of this catalyst over sputtered catalysts known in the art is believed to arise from the presence of the cosputtered support component in the sputtered catalyst deposit. The cosputtered support component acts both to disperse the catalytic metal so as to increase the number of catalytic sites for a given amount of metal and to bind the metal to the substrate thereby allowing metal concentrations capable of sustaining industrial reaction rates without significant loss of metal dispersion at operating temperatures.

DETAILED DESCRIPTION

The catalyst of this invention comprises a low surface area particulate support or substrate and a thin film composite deposit which is sputtered onto the substrate.

The catalyst substrate materials have low surface area and are stable under the reaction use conditions. Refractory materials, e.g., oxides, nitrides and carbides such as $SiO_2$, $Al_2O_3$, $TiO_2$, MgO, SiC and $Si_3N_4$ are preferred. Glasses that satisfy the stability requirement can also be used. Especially preferred are $Al_2O_3$ and $SiO_2$. Surface areas for the particulate support are preferably less than 10 $m^2/g$. Particulate size is not critical but, on the basis of ease of preparation, the preferred particle size is greater than 100 μm as will be discussed below.

The sputtered thin film composite is formed of one or more catalytically active metals such as Pt, Pd, Ag, Au, Re, Rh, Ru and Ir and a cosputtered support material.

The cosputtered support material is preferably an oxide, nitride or carbide and is preferably the same material as the particulate substrate material to provide better binding and adhesion to the substrate. Especially preferred as the cosputterable support material and substrate materials are the oxides Al$_2$O$_3$ and SiO$_2$.

The composite sputtered coatings of this invention can be prepared by sputtering from a single composite target of the metal or metals and the cosputterable support material or by sputtering simultaneously or sequentially from separate targets of the metals or metal alloy and the cosputterable support material. To illustrate, if the sputtered composite is comprised of two metals and a cosputterable support material, one, two or three targets can be used. A single component target would be formed of all three materials; two targets would be formed of one of the metal alloy and one of the cosputterable support material or one of metal cosputterable support material and one of the other metal. Three targets would consist of a separate target for each metal and the cosputterable support material.

It is highly desirable to have a uniform mixture of the components within the composite deposit. This is more easily achieved when all components issue from a single target. In this case, the particulate substrates can be mixed by vibrating or tumbling them during sputtering for example by vibrating the particles in a dish attached to a piezoelectric driver or audio speaker, or by manually agitating them by means of a manipulator arm attached to the dish through a vacuum feedthrough, or the sputtering can be interrupted and the particles mixed outside the sputtering chamber. In the case of simultaneous/sequential sputtering from multiple targets, sputtering can be interrupted several times and the particles removed from the chamber and mixed. With multiple targets, it is also necessary to rotate the table on which the substrate particles rest during the sputtering, again to provide a good mixture of the sputtered components. A table rotation speed of several revolutions per minute is sufficiently fast for good mixing of the composite components. In the case of Ag/SiO$_2$ composites prepared with such rotations, X-ray diffraction and transmission electron microscopy confirm that films consist of Ag particles less than 100 Å diameter dispersed in an amorphous SiO$_2$ matrix. The preferred substrate particle size is greater than 100 microns. Below this size, mixing and efficient coating of particles becomes difficult. The upper size limit is only restricted by its utility as a catalyst support in a given apparatus and process.

Specifically RF sputtering has been used to produce the coatings because it is particularly suited to the preferred cosputterable support material targets. Initially the sputtering chamber is evacuated to between $10^{-6}$ and $10^{-7}$ Torr by a conventional vacuum pumping station. A small amount of argon gas is let into the chamber and ionized by a 13.56 MHz ionizing RF field applied between the target materials to be sputtered and the substrate table. Positively charged argon ions are then accelerated toward the targets, which are at negative potential. The argon ions dislodge atomic species of the targets which deposit on the substrates below. The argon pressure was usually in the range $5 \times 10^{-3}$ Torr to $20 \times 10^{-3}$ Torr, but other pressures would be workable. Further, other inert gases such as neon, krypton or xenon can be used, but argon is preferred because it is less expensive, readily available and gives high sputtering yields with most materials. This preparation is not limited to RF sputtering but would also be expected to be accomplished by other sputtering methods, e.g., ion beam sputtering, which uses a separate source of accelerated ions, or by either RF or DC magnetron (magnetic-field enhanced) sputtering.

An advantage of sputtering from multiple targets is that the composition of the cosputtered composite catalyst can be varied by changing the relative target voltages. For example, in the preparation of Ag/SiO$_2$ on fused silica particles, the concentration of Ag was controlled at 0.038%, 0.175%, 0.63%, 1.22% and 1.87% weight percent (based on the total weight of the substrate and the sputtered composite) with sputtering experiments of equal duration by adjusting the voltage on the Ag target at 100 V, 250 V, 500 V, 750 V and 1000 V respectively, relative to about 1500 V on the SiO$_2$ target. Over this voltage range the volume concentration of Ag in the sputtered coating varies from 4% (100 V) to about 70% (1000 V), the balance being SiO$_2$.

In the sputtering of multimetal catalysts, from separate metal and nonmetal targets, e.g., Ag/Au/SiO$_2$ on SiO$_2$ particles, the ratio of the metals can also be controlled by the target voltage. Ag/Au/SiO$_2$ films were prepared with Ag/Au atomic ratios of 95/5, 88/12, 75/25, 65/35 and 60/40. These ratios depend on sputtering voltages in a predictable way (see, e.g., Handbook of Thin Film Technology, Maissel and Gland) according to $$R_{Ag}/R_{Au} \sim \left(\frac{V_{Ag}}{V_{Au}}\right)^{3/2}.$$

where R is the sputtering rate and V is the sputtering voltage. The relative concentration of total metal to nonmetal is also controlled by adjusting the sum of the metal target voltages ($V_{Ag}+V_{Au}$) relative to the cosputterable noncataly material target (SiO$_2$) voltage.

Ag/Au/SiO$_2$ composite thin films were also prepared by sputtering from a Ag/Au alloy target and a SiO$_2$ target. Catalysts were prepared by coating fused silica particles from an alloy target with atomic ratio 60 Ag/40 Au and a SiO$_2$ target. For alloy target voltages of 500 V, 750 V and 1000 V relative to about 1500 V on SiO$_2$ the metal concentrations varied from 0.46-1.15-1.79 weight percent for sputtering experiments of equal duration. The Ag/Au atomic ratio in the films in all cases was 60 Ag/40 Au, as confirmed by atomic absorption analysis, the same as in the target.

Ag/SiO$_2$ or Ag/Au/SiO$_2$ coatings can also be prepared from a single composite target. For example, an Ag/SiO$_2$ target was fabricated by mixing finely-divided Ag and SiO$_2$ powders with a weight ratio of 88/12, respectively in a ball-mill. The mixed powders were pressed at 10,000 lbs into a 2 inch diameter disk and then fired for 16 hours in air at 640° C. This produced a dense disk when used as a target from which to sputter composite catalysts. X-ray diffraction of these thin films showed finely-divided Ag of about 55 Å diameter dispersed in an amorphous silica matrix. These results are similar to those obtained by sputtering from separate Ag and SiO$_2$ targets onto substrates that are rotated.

The surface area of the sputtered composite coatings increases with increasing coating thickness in contrast to the surface area of smooth evaporated or sputtered metal films which is independent of film thickness. This is illustrated in Table I for Ag/SiO$_2$ composite coatings on fused silica particles prepared by sputtering from separate Ag and SiO$_2$ targets onto fused silica particles on a rotating substrate table.

TABLE I

| Voltage on Silver Target $V_{Ag}$ (volts) | Sputtering Time (hrs) | Surface Area (m$^2$/g) |
|---|---|---|
| 500 | 3 | 0.112 |
| 500 | 6 | 0.163 |
| 750 | 3 | 0.124 |
| 750 | 6 | 0.245 |
| 1000 | 3 | 0.149 |
| 1000 | 6 | 0.313 |

Since the fused silica particles themselves have negligibly small surface area (<0.03 m$^2$/g), the surface area of the coated particles can be attributed to the coating alone. From measurements of the actual metal loading, the surface area of the metal alone in the samples of Table I is estimated to be about 20 m$^2$/g.

The performance of the catalysts of this invention has been demonstrated for a number of specific processes.

Catalysts comprised of Ag/SiO$_2$ sputtered on low surface area fused silica particles are more active for formaldehyde synthesis from methanol by oxidative dehydrogenation than Ag alone sputtered on the same particle substrates and give yields at least equivalent to bulk Ag at high conversion of methanol and 1-2% better yields at lower conversions with only 1/100 as much Ag. High activity, selectivity and stability at commercially useful flow rates also obtain for Ag/MgO and Ag/Au/SiO$_2$ films on fused silica particles.

Catalysts of Pd/SiO$_2$ films sputtered on low surface area, particulate fused silica show high stability as hydrogenation catalysts in peroxide synthesis.

EXAMPLES OF THE INVENTION

EXMPLES 1-4

Catalysts comprised of Ag/SiO$_2$ composites sputtered onto fused silica were prepared by RF sputtering simultaneously from separate targets of Ag and SiO$_2$. In each example, fused silica particles (average dimension about 2 mm), were distributed in several pyrex dishes on a rotating substrate table beneath the targets and coated with the sputtered deposit. Approximately 15 g of fused silica was used in each of Examples 1-3 and approximately 14 g was used in Example 4. The sputtering voltages used for each target are reported in Table II.

TABLE II

| Example No. | Voltage on Silver Target $V_{Ag}$ (volts) | Voltage on Silica Target $V_{SiO_2}$ (volts) |
|---|---|---|
| 1 | 250 | 1550 |
| 2 | 500 | 1500 |
| 3 | 750 | 1400 |
| 4 | 1000 | 1400 |

In each example, the argon pressure was maintained at 8×10$^{-3}$ Torr and the particulate substrates were rotated at 5 rev/min. The duration of the sputtering was 6 hours with periodic mixing of the particles outside the sputtering chamber.

These catalysts were then used in the synthesis of formaldehyde from methanol. A description of the process and the experimental techniques are described in U.S. Pat. No. 4,219,509 (Rao and Nielsen). For a given conversion of methanol to formaldehyde, the yield using the composite catalysts is greater than for bulk silver at low conversions, and at least equivalent to it at higher conversion, even though the concentrations of Ag are only 1/100 that of the bulk Ag catalyst. By "methanol conversion" is meant moles of methanol converted to other products per mole of methanol fed. By "selectivity to formaldehyde" is meant moles of formaldehyde formed per mole of methanol converted. By weight percent metal (e.g., weight percent Ag) is meant the weight of metal divided by the total weight of the substrate and the sputtered deposit times 100. The results are reported in Table III, as are the results for bulk silver.

EXAMPLE 5

A catalyst comprised of a Ag/MgO composite sputtered onto fused silica was prepared by RF sputtering from separate targets of Ag and MgO. Approximately 17 g of fused silica particles (average dimension about 2 mm), distributed in several pyrex dishes on a rotating substrate table beneath the targets, were coated. The sputtering voltages were 500 volts on the Ag target and 1200 volts on the MgO. The argon pressure was maintained at 3×10$^{-3}$ Torr and the particulate substrates were rotated at 5 rev/min. The duration of the sputtering was 6 hours with periodic mixing of the particles outside the sputtering chamber.

This catalyst was also used in the synthesis of formaldehyde and the results are reported in Table III.

EXAMPLE 6

A Ag/SiO$_2$ composite catalyst was prepared by RF sputtering from a solid composite target of Ag and SiO$_2$ homogeneously mixed and with a Ag/SiO$_2$ weight ratio of 88/12. Approximately 5 g of fused silica particles (average dimension about 2 mm), in a single pyrex dish, were coated. The particles were mixed during sputtering by mechanical agitation of the substrate dish attached to an arm that exited the vacuum chamber through a vacuum-tight feedthrough. The target voltage was 2200 volts; the argon pressure was 8×10$^{-3}$ Torr; and the duration of sputtering was 2 hours.

Results when used in the synthesis of formaldehyde are reported in Table III.

EXAMPLE 7

A Ag/Au/SiO$_2$ composite catalyst containing 4.5 weight percent metal was prepared by RF sputtering simultaneously from a Ag/Au alloy target and a SiO$_2$ target. The composition of the alloy target was 60 At. percent Ag and 40 At.percent Au. Approximately 10 g of fused silica particles (average dimension about 2 mm), distributed in several pyrex dishes on a rotating substrate table beneath the targets, were coated with the sputtered deposit. The sputtering voltages were 500 volts on the alloy target and 1700 volts on the SiO$_2$. The argon pressure was maintained at 8×10$^{-3}$ Torr and the particulate substrates were rotated at 5 rev/min. The duration of the sputtering was 4 hours with periodic mixing of the particles outside the sputtering chamber. Example 7(a) is a control using 60/40 Ag/Au crystals as the catalyst.

The catalyst was also used in the synthesis of formaldehyde. The results are reported in Table III.

TABLE III

| | Wt % Ag or Ag/Au (metal/nonmetal) | Mole Ratio O$_2$/MeOH | Bed T °C. | Conv. MeOH % | Selectivity HCHO % |
|---|---|---|---|---|---|
| Showing A | bulk | 0.260 | 640 | 75.2 | 92.4 |
| | | 0.360 | 700 | 91.0 | 92.7 |
| Example 1 | 0.180 (Ag/SiO$_2$) | 0.264 | 690 | 66.9 | 94.1 |
| | | 0.303 | 700 | 77.8 | 93.6 |
| Example 2 | 0.63 (Ag/SiO$_2$) | 0.28 | 695 | 75.4 | 93.0 |
| | | 0.380 | 710 | 94.3 | 92.0 |
| Example 3 | 1.2 (Ag/SiO$_2$) | 0.265 | 695 | 76.7 | 93.0 |
| | | 0.350 | 700 | 90.1 | 92.8 |
| Example 4 | 2.05 (Ag/SiO$_2$) | 0.269 | 685 | 76.8 | 92.4 |
| | | 0.351 | 700 | 91.0 | 92.3 |
| Example 5 | 0.58 (Ag/MgO) | 0.260 | 700 | 64.8 | 94.4 |
| Example 6 | 2.0 (Ag/SiO$_2$) | 0.236 | 630 | 68.6 | 92.9 |
| Example 7 | 4.5 (Ag/Au/SiO$_2$) | 0.256 | 622 | 68.5 | 92.8 |
| Example 7 (a) | bulk (Ag/Au) | 0.236 | 586 | 62.4 | 92.5 |

I claim:

1. A composite catalyst comprising a particulate support having a surface area of less than 10 m$^2$/g and a particle size of greater than 100 μm having sputtered on the surface thereof and intimately adhered thereto from 0.01 to 5.0 weight percent as based on the total catalyst of a catalytically active metal and a cosputtered support material in such amount that the catalytically active metal comprises from 3–80 volume percent of the sputtered material.

2. The catalyst of claim 1 wherein the cosputtered support material is of the same composition as the particulate support.

3. The catalyst of claim 2 wherein the particulate support is a refractory material.

4. The catalyst of claim 3 wherein the particulate support is an oxide, nitride or carbide.

5. The catalyst of claim 4 wherein the particulate support is SiO$_2$, Al$_2$O$_3$, TiO$_2$, SiC, or Si$_3$N$_4$.

6. The catalyst of claim 5 wherein the catalytically active metal is Pt, Pd, Ag, Au, Re, Rh, Ru or Ir and mixtures thereof.

7. The catalyst of claim 6 wherein the particulate material is Al$_2$O$_3$, SiO$_2$ or MgO.

8. The catalyst of claim 7 wherein the catalytically active metal is Ag, Ag/Au, Pd or Pt.

* * * * *